United States Patent [19]
Heitlinger

[11] 3,840,956
[45] Oct. 15, 1974

[54] WHEEL RIM STRIP ASSEMBLY

[75] Inventor: Eugene von Heitlinger, Chicago, Ill.

[73] Assignee: Schwinn Bicycle Company, Chicago, Ill.

[22] Filed: Feb. 4, 1974

[21] Appl. No.: 439,383

[52] U.S. Cl................................ 29/33.5, 29/159.02
[51] Int. Cl.......................... B23p 23/04, B21k 1/34
[58] Field of Search..... 29/33.5, 33.52, 33 E, 159.1, 29/159.02

[56] References Cited
UNITED STATES PATENTS

| | | | |
|---|---|---|---|
| 3,548,740 | 12/1970 | Kobiella | 156/73 |
| 3,758,931 | 9/1973 | Patterson | 29/159.02 |

*Primary Examiner*—Gil Weidenfeld

[57] ABSTRACT

Nylon strip wrapped peripherally around rim of spoked wheel having radial spoke apertures and valve stem hole, nipples extending through apertures and connected, respectively, to outer ends of spokes, strip frictionally engaging outer ends of nipples to prevent puncture of subsequently mounted tire on rim by accidentally loosened nipple, and having aperture cut therethrough after mounting on rim to coincide with valve stem hole, together with novel method of so mounting strip on wheel rim and apparatus for accomplishing same comprising strapping means, wheel support means including pin cooperating with valve stem hole to properly locate wheel in a loading position which is adjustable to accommodate different diameter wheels, manually operable control means to initiate lowering of support means, switch means automatically operable to stop support means, to present wheel to strapping means and initiate cyclic actuation thereof to wrap nylon strip peripherally around rim, tension, cut and secure ends of strip together, and piercing means operable to cut an aperture in mounted strip coinciding with valve stem hole and to initiate upward movement of support means to return same to loading position.

7 Claims, 9 Drawing Figures

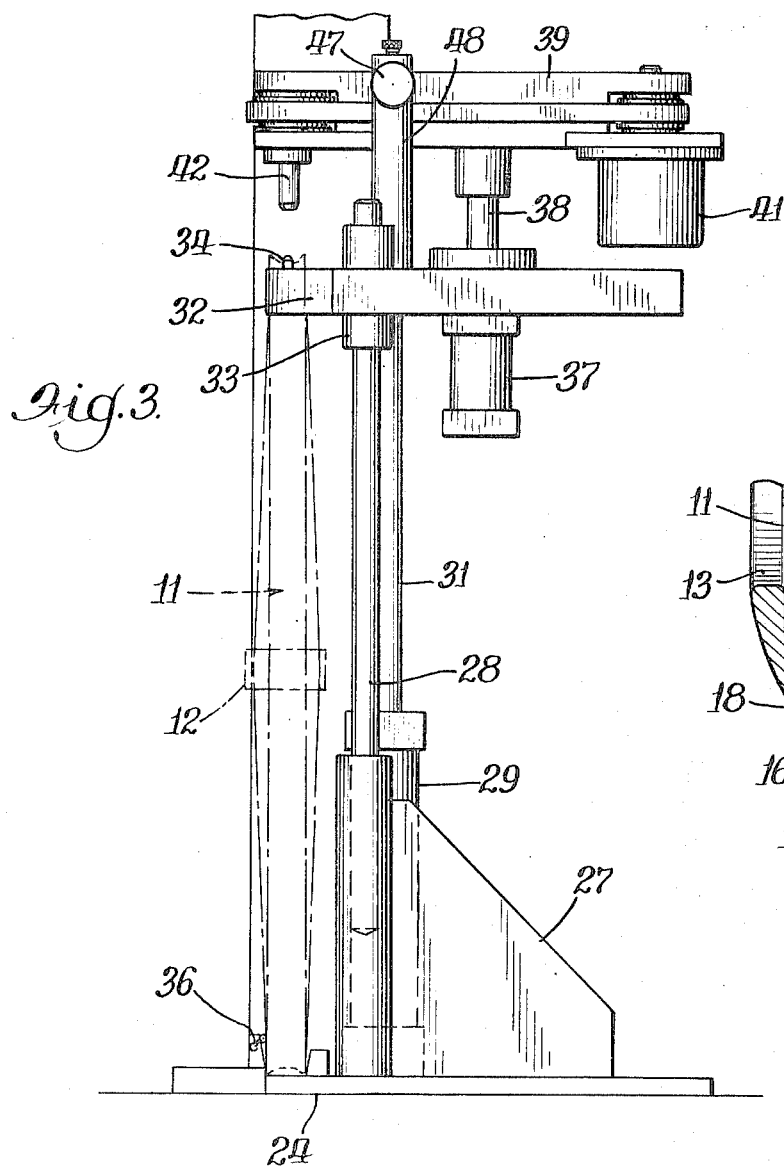
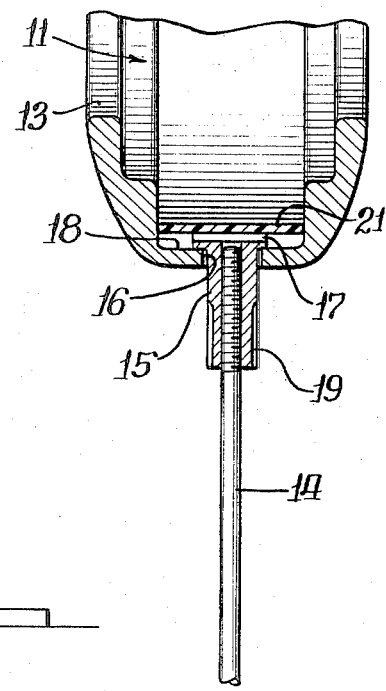
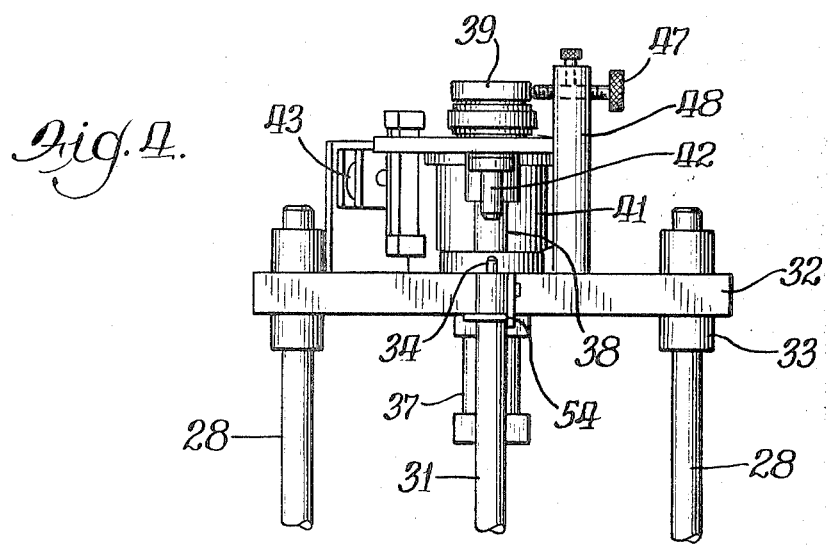

WHEEL RIM STRIP ASSEMBLY

BACKGROUND OF THE INVENTION

1. Field of the Invention

This invention relates generally to bicycles, and more particularly to spoked wheels therefor.

2. Description of the Prior Art

The customary manner of securing the spokes in a bicycle wheel is by engaging an inner hooked end of each spoke in an aperture in a hub flange and tensioning the spoke by screwing a nipple onto its outer end which extends through an aperture in the rim and engages the outer surface of a central peripheral groove in the rim. A tire or tire and tube then may be mounted in well-known manner on the rim, it being understood that the valve stem thereof extends through a suitable hole in the central peripheral groove of the rim.

If one of the spoke nipples becomes loose during operation of the bicycle, it will very quickly penetrate or puncture the tube or tire. An attempt has been made to solve this problem by stretching an endless rubber band over the rim and positioning it in the central peripheral groove, with a pre-punched aperture in the rubber band coinciding with the valve stem hole, before mounting the tire. This has proven not to be very effective at best because the rubber has a marked tendency to float and become dislocated relative to the spoke nipples in use, and it is difficult to initially properly align the aperture in the rubber band with the valve stem hole in the rim.

SUMMARY OF THE INVENTION

The problems encountered with the prior art structures have been overcome with the instant invention which comprises a novel combination of an extruded strip of nylon wrapped peripherally around the rim of a bicycle wheel having a central peripheral groove with apertures receiving nipples anchoring the outer ends of the wheel spokes, the nylon strip having been tensioned after wrapping, cut, the resulting ends secured together, and thereafter being pierced to provide a hole coinciding with the valve stem hole in the rim, the nylon strip thereby being disposed in the peripheral groove of the rim and engaging the outer ends of the spoke nipples. The invention also comprises this novel method for so mounting a nylon strip on a bicycle rim and the apparatus for accomplishing the same.

In the drawings:

FIG. 3 is a side elevation of the support and piercing means as seen from the left side of FIG. 1 and on substantially the same scale as FIG. 2;

FIG. 4 is a front elevation of the upper end of the support means as seen from the left of FIG. 3;

FIG. 5 is an enlarged detail transverse section through a portion of a wheel with a tire protecting strip mounted in the base portion of the rim in contact with the outer end of a spoke nipple;

DESCRIPTION OF PREFERRED EMBODIMENTS

Figure 1:
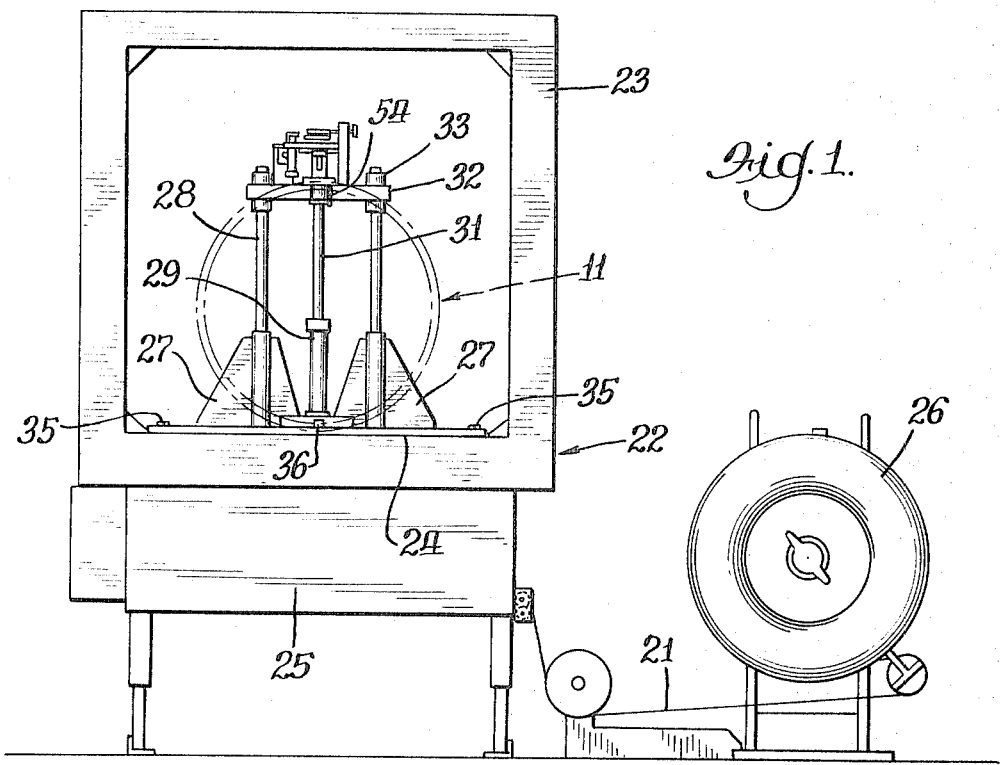
FIG. 1 is a front elevation of an embodiment of the apparatus incorporating the invention.

Referring to FIGS. 1, 3, 5 and 7, a spoked wheel illustrated in section in FIG. 5 and in broken lines in the others and designated generally by reference numeral 11 comprises a hub 12, a rim 13, and a plurality of spokes 14 each secured at its inner end to the hub 12 and at its outer end to the rim by a nipple 15, the rim having the usual valve stem hole extending radially therethrough. As shown in FIG. 5, each nipple 15 extends through a radially disposed spoke aperture 16, has a slotted outer flange 17 engaging the inner peripheral surface 18 of the rim 13 and a tapped bore enabling it to be screwed onto the threaded outer end of the spoke 14, as by means of its slotted flange or wrench-receiving flats 19 on its outer surface.

Such spoked wheels are well-known, as is the fact that even though initially tightened properly, a nipple 15 may become loosened, and particularly because of rough use or high speed of travel, the resulting rotative unscrewing of a loosened nipple will very quickly puncture a tube or tire mounted on the wheel rim. The present invention effectively eliminates such damaging results by the winding or wrapping of an extruded nylon strip 21 peripherally around the central groove of the rim 13, tensioning the strip, cutting and securing its ends together so that the strip frictionally contacts the outer flanges 17 of all of the nipples 15, and thereafter cutting an aperture through the strip 21 coinciding with the valve stem hole in the rim 13. This procedure assures easy access to the valve stem hole in the rim for the usual valve stem and the strip 21 not only functions to restrain all of the nipples 15 against accidental loosening, but also effectively protects the tube or tire against being damaged or punctured by a nipple which may work loose.

As a specific comparative example of the degree of protection afforded by the nylon strip 21, a series of tests were performed, all on a 27 inch Endrick rim with National Puff H.P.R.R. tire and tube inflated to 75 psi, with two different brands of standard spoke nipples, Union and Torrington, and a nipple rotated until loss of air pressure, with no rim strip, a National rubber rim strip, and the instant nylon rim strip 21, respectively. Following are the times at which the no strip and rubber strip configurations failed by blowing the tube, and the time at which the nylon strip test was terminated. There was no failure in the nylon strip test, although heavy scoring of the strip resulted.

| Rim Strip | Nipple | Hr. | Min. | Sec. | Revolutions |
|---|---|---|---|---|---|
| No strip | Union | 0 | 0 | 10 | 71 |
|  | Torrington | 0 | 0 | 3 | 21 |

| Rim Strip | Nipple | Hr. | Min. | Sec. | Revolutions |
|---|---|---|---|---|---|
| Rubber strip | Union | 0 | 2 | 30 | 1,075 |
| | Torrington | 0 | 0 | 59 | 422 |
| Nylon strip | Union | 1 | 15 | 0 | 32,250 |
| | Torrington | 1 | 15 | 0 | 32,250 |

In addition to the previously described spoked wheel 11 incorporating the nylon strip 21 and the indicated method of applying the strip to the wheel, this invention contemplates novel apparatus for effecting that combination. A first embodiment of such apparatus is shown in FIGS. 1–4. Reference numeral 22 indicates in general a strapping machine similar to that disclosed in U.S. Pat. No. 3,548,740 comprising an upper frame 23 defining a closed path for a carrier which forms a tensioned loop of strap about an article, such as the wheel 11, placed on the upper surface or top plate 24 of a lower casing 25. The strap, in this case the nylon strip 21, is fed from a storage spool mechanism 26, and means fully disclosed in said U.S. Pat. No. 3,548,740 are housed within casing 25 for cutting the tensioned strip 21 after it has been looped about the wheel 11 and securing the ends of the strip together. The sealing means in that patent perform a friction fusion operation, but it will be appreciated that any other method, such as the use of quick-setting adhesive, may be employed that will satisfactorily retain the ends of the tensioned strip 21 together. After so forming the tensioned strip 21, it is released by the strapper 22 to assume its final position of FIG. 5 in the peripheral groove in the rim 13 in frictional engagement with all of the spoke nipples 15.

Wheel support means are mounted on the top plate 24 in any suitable manner which comprise base members 27 having vertical apertures receiving guide pins 28 and air motor means including a cylinder 29 having an air-operated piston with an upwardly extending piston rod 31 secured at its upper end to a support and locator plate 32. The latter carries bushings 33 in suitable apertures therethrough for slidably engaging the guide pins 28. An upstanding locator pin 34 is provided on a central forward projection of the plate 32 for engaging in the valve stem hole of the rim 13 of a wheel 11 when the wheel is placed thereon as shown in broken lines in FIGS. 1 and 3. When so disposed, the wheel is supported by the plate 32 in loading position, and the operation of control means subsequently to be described may be initiated by depressing both of two manually operable switches or palm buttons 35 (FIG. 1) to cause downward movement of piston rod 31 and plate 32 to lower the wheel 11 to operative position relative to strapping means 22 and resting on the top plate 24 thereof. As the wheel reaches that operative position, it actuates a switch means 36, preferably in the form of a spring sensor, automatically operable to stop movement of piston rod 31 and support plate 32 and to initiate cyclic actuation of the strapping machine 22.

Mounted on support plate 32 for movement with and relative thereto is a piercing means comprising air motor means including a cylinder 37 having an air-operated piston with an upwardly extending piston rod 38 rotatably supporting at its upper end a frame 39 carrying a motor 41 at its rear end, a piercing cutter 42 depending from its forward end and suitable transmission means for causing the motor to rotate the cutter. The frame 39 is adapted to be swung horizontally about the vertical axis provided by the piston rod 38 between an operative position with the cutter 42 axially aligned with the locator pin 34, as shown in full lines in the drawings, and a retracted position illustrated in broken lines in FIG. 2. This may be accomplished by an air cylinder 43 mounted on the locator plate 32 and having a piston with a rod 44 connected at its forward end (FIG. 2) by a pin 45 and slot 46 to the piercing frame 39.

Upon completion of a cyclic operation of the strapping machine 22, the motor 41 is energized, the air cylinder piston is extended to cause the piston rod 44 to swing the frame 39 into operative position against an adjustable stop 47 carried by a bracket 48 extending upwardly from the support and locator plate 32, and air is directed into the upper end of cylinder 43 and exhausted from its lower end to retract the piston rod 44 to lower frame 39. The piercing cutter 42 is hollow ground to accommodate the locator pin 34 so that it thereby cuts an aperture through the tensioned strip 21 which coincides with the valve stem hole in the rim 13 through which pin 34 extends. Upon completion of that strip piercing operation, valve means controlling air cylinder 43 in a manner to be described later causes extension of piston rod 38 to raise the frame 39 relative to locator plate 32, piston rod 44 is retracted to swing the frame 39 to inoperative position, and the piston rod 31 is extended to raise the support and locator plate 32 back to loading position.

It will be understood that if a large number of spoked wheels having rims of the same diameter are to be provided with the nylon strips 21, it may be desirable to render the means for raising and lowering the support and locator plate 32 temporarily inoperative and merely load and unload such wheels with the locator plate retained at the appropriate lower operative position. Of course, the advantage of being able to move the support and locator plate as previously described is that the machine thereby may be used in successive operations to apply nylon strips 21 to wheels having different diameters.

Figure 6:
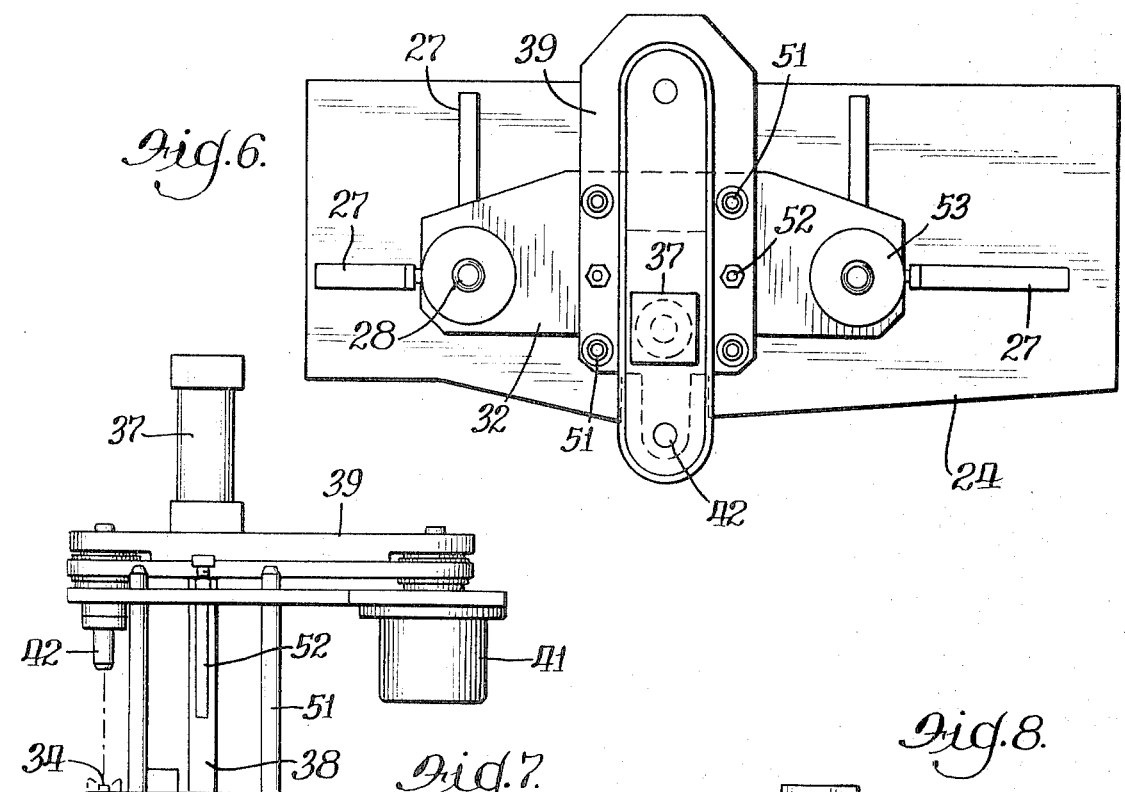
FIG. 6 is a top plan view similar to FIG. 2 of a modified form of apparatus in which the strip piercing means is movable only vertically relative to the wheel support means.
Figure 7:
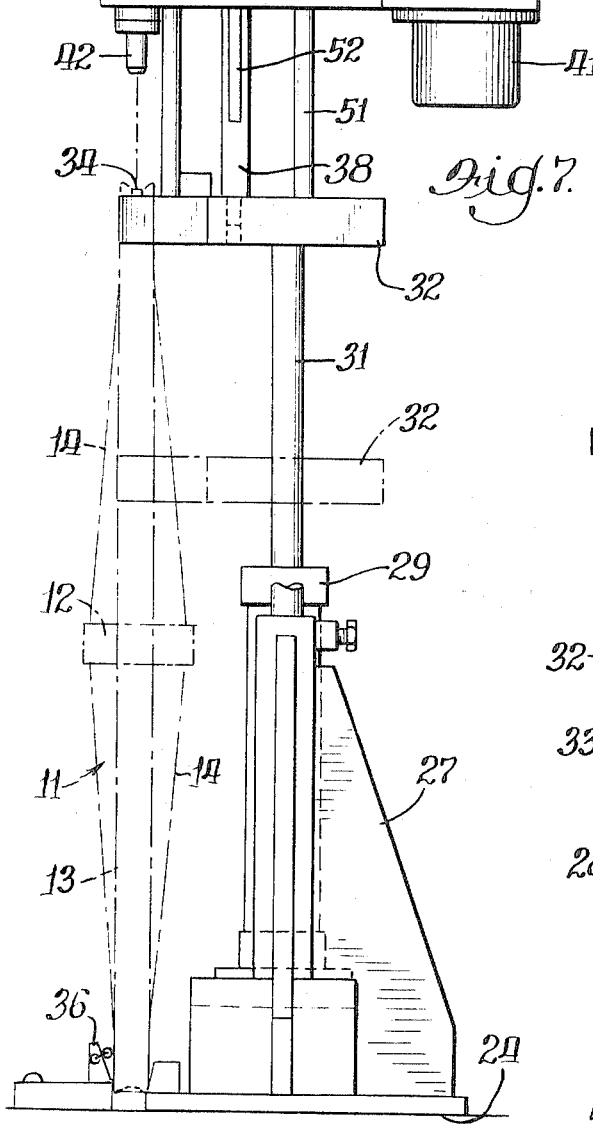
FIG. 7 is a side elevation similar to FIG. 3 of the modified support and piercing means of FIG. 6 showing a wheel in broken lines on the support means in strapping position and the support means in broken lines in a lowest strapping position for wheels of minimum diameter.
Figure 8:
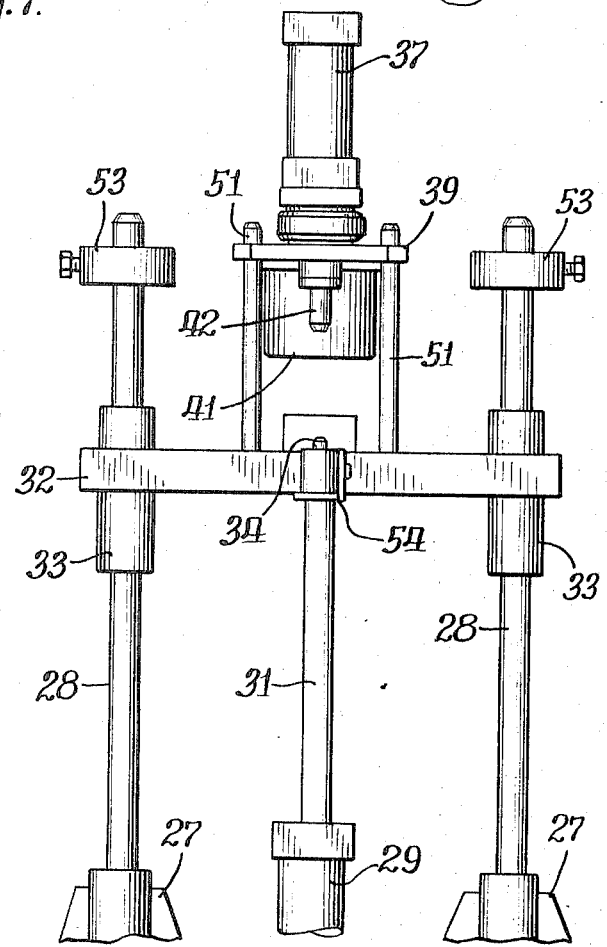
FIG. 8 is a front elevation similar to FIG. 4 of the modification of FIGS. 6 and 7.

A second embodiment of apparatus for applying the nylon strips 21 to spoked wheels is illustrated in FIGS. 6–8. This is for use with a strapping machine 22 having guides for angularly deflecting the strip 21 as it is being wrapped around the wheel 11, whereby a non-pivoting valve stem hole-piercing unit may be employed. To this end, the same reference numerals are used for the modification of FIGS. 6–8 as were used in connection with that of FIGS. 1–4 and the parts so identified in each are substantially the same except that the air cylinder 37 and its piston rod 38 are inverted, with piston rod 38 connected to the support and locator plate 32 (FIG. 7) and cylinder 37 connected to the frame 39. In this modification of FIGS. 6–8 the frame 39 is not required to be swung horizontally, so it is guided in its vertical movements relative to the plate 32 by rods 51 secured at their lower ends to the plate 32 and extending through suitable apertures in the frame 39. Vertically adjustable stop pins 52 (FIGS. 6 and 7) depend from the frame 39 for engagement with the plate 32 to limit downward movement of the piercing cutter 42 relative to the plate 32 and a wheel supported thereby with its rim 13 having its tire valve hole engaged by the locator pin 34. Means also are provided in this modification for limiting upward movement of the wheel support plate 32 which comprises stop rings 53 (FIGS. 6 and 8) adjustably mounted on the guide pins 28.

Figure 2:
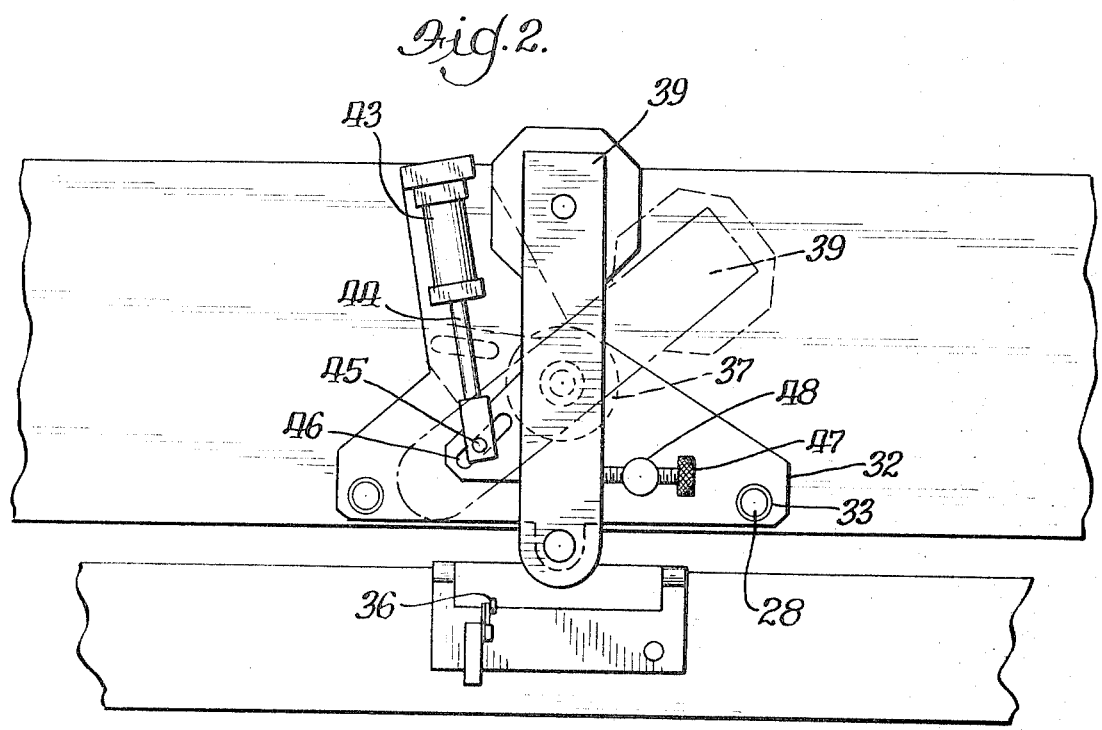
FIG. 2 is a top plan view of a portion of the wheel support means on an enlarged scale showing the strip piercing means in normal retracted position in broken lines and swung to operative position in full lines.

While the switch means 36 is illustrated differently in FIG. 7 than in FIGS. 1–3, it comprises a spring sensor in each modification adapted to be actuated by a wheel rim as it is placed in strapping position, either when the wheel support and locator plate 32 is held in strapping position and use of cylinder 29 is dispensed with during operations on a large number of wheels of the same diameter, or when the plate 32 is lowered as hereinafter described to place a rim properly positioned thereon in strapping position. Both modifications of the apparatus include wheel registry safety means, preferably in the form of ball sensors 54 of well-known construction, (FIGS. 1, 4 and 8) which prevent machine operation if a wheel is not properly positioned on the locator pin 34 of the support plate 32.

Figure 9:
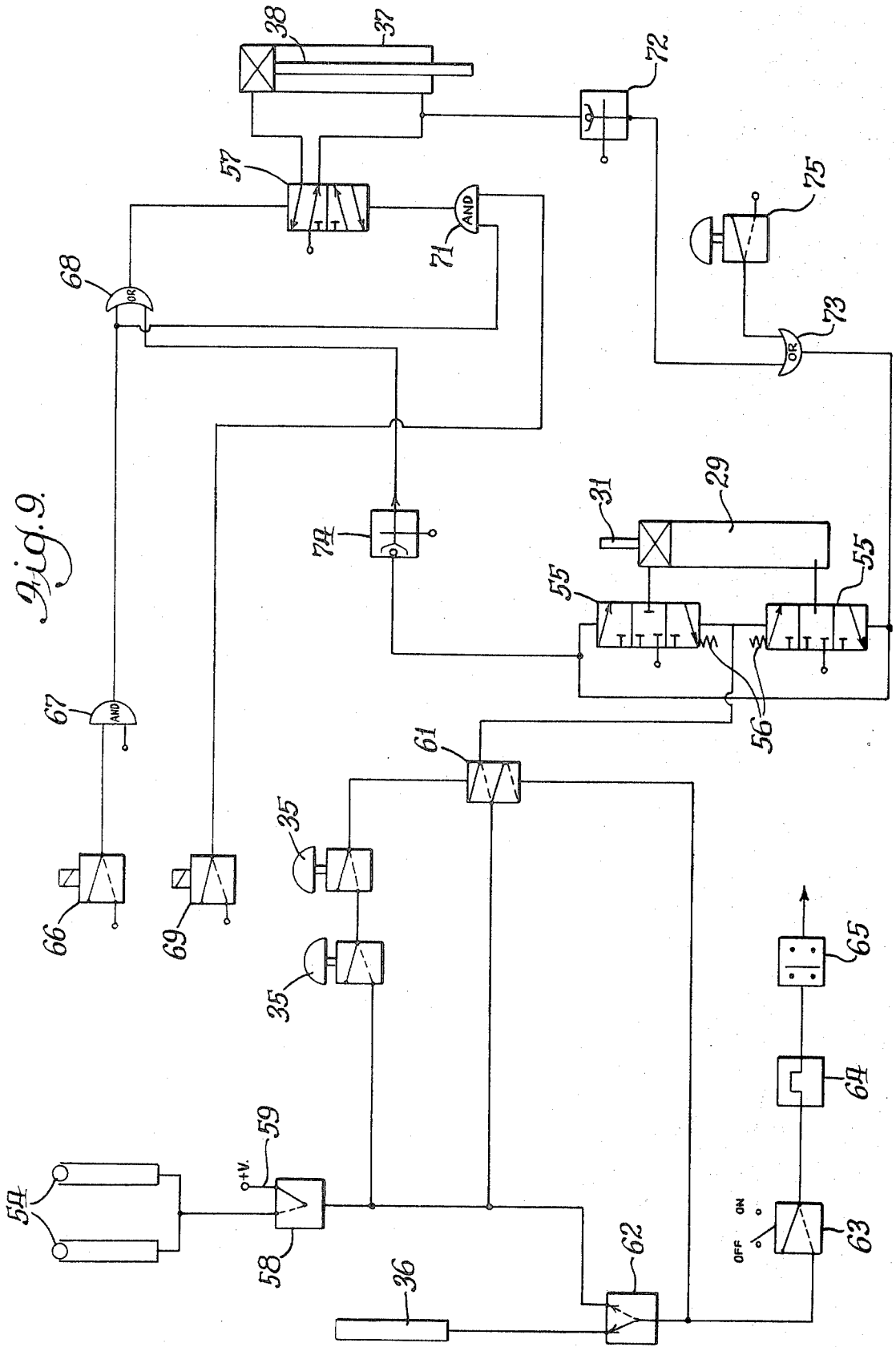
FIG. 9 is a schematic wiring diagram of a control circuit for the instant apparatus.

Operation of the apparatus now will be described with reference to the schematic diagram of FIG. 9. As illustrated therein, the cylinder 29 and its piston 31, which raise and lower wheel support plate 32, comprise a spring-centered air motor of well-known construction including switch valves 55 and springs 56 which normally maintain the valves in intermediate or inoperative positions. The cylinder 37 and its piston 38 for moving the piercing cutter 42 vertically relative to the support plate 32 comprise an air motor including a switch valve 57 for controlling its operation. The two ball sensors 54 are connected to a bleed relay 58 interposed in a line 59 comprising a source of electric energy. If a wheel rim is not properly positioned on the support plate 32 with its valve stem hole ingaged by the locator pin 34, one or the other of the ball sensors 54 will break the circuit through bleed relay 58 and prevent machine operation in response to closing of both start cycle switches or palm buttons 35. However, if a wheel rim is properly positioned on plate 32, closing of both switches 35 will complete a circuit from line 59 to actuate a flip-flop switch 61 to complete a circuit to actuate valves 55 against their springs 56 to direct air to the upper end of cylinder 29 and to open the lower end thereof to the atmosphere which lowers piston rod 31 and the wheel support 32.

As the wheel thus lowered arrives at its lowermost operative position in the strapper, the spring sensor 36 is actuated to effect actuation of a second bleed relay 62 which breaks the circuit through flip-flop switch 61 to permit springs 56 to return the valves 55 of cylinder 29 to normal intermediate or inoperative positions, and also completes a circuit through a strapper on-off switch 63, an impulse generator 64 and a pressure switch 65 to initiate a cyclic operation of the strapper 22.

It will be understood that in addition to requiring operation of both palm buttons 35, another safety feature is employed which comprises a known infrared safety curtain interface operable if anything is moved into the upper frame 23 to stop the machine. This includes a normally deenergized solenoid 66 (top of FIG. 9) which accomplishes that function when energized but, when deenergized, allows flow of current through a NOT gate or switch 67 to send a signal through an OR gate 68 to the switch valve 57 to effect air retraction of piston rod 38 into cylinder 37 to thereby raise the piercing cutter 42 to inoperative position.

As the strapping cycle is completed which was initiated by operation of the pressure switch 65, a solenoid 69 is energized to start a cut signal through an AND gate 71 to move the valve 57 to effect air movement of piston rod 38 to lower the piercing cutter 42. This signal also is employed to energize the cutter rotating motor 41.

As the cutter 42 completes its operation and reaches its lowermost position, a pressure release trip (P.R.T.) 72 is thereby actuated to complete a signal through an OR gate 73 which actuates the valves 55 to direct air to the lower end of cylinder 29 and to open the upper end thereof to the atmosphere which raises piston rod 31 to return the wheel support 32 to loading and unloading position. At the same time, the signal from OR gate 73 causes a P.R.T. 74 to initiate a raising or retracting of the cutter 42 through the agency of effecting a signal through the OR gate 68 to the switch valve 57. Incidentally, if at any time following completion of a cycle of operation of the strapping machine 22 it is desired to return the wheel support 32 to its initial upper position, such may be accomplished by depressing a manual return switch 75 associated with the OR gate 73.

While the specific embodiments of this invention have been illustrated and described with respect to a bicycle wheel, it will be appreciated that it is equally applicable to use with any spoked wheel, such as for motorcycles or other vehicles, using means for fastening the outer ends of the spokes to the rim which may accidentally become loosened during use.

It is thought that the invention and many of its attendant advantages will be understood from the foregoing description, and it will be apparent that various changes may be made in the form, construction and arrangement of the parts and the methods employed without departing from the spirit and scope of the invention or sacrificing all of its material advantages, the forms and the method hereinbefore described being merely preferred embodiments thereof.

I claim:

1. Apparatus for mounting a nylon strip around the periphery of the rim of a spoked wheel having a valve stem hole therethrough and spokes with their outer ends secured to said rim by nipples extending therethrough, wheel support means including locator means cooperating with said valve stem hole to properly position said wheel thereon when in a loading position, manually operable control means for initiating movement of said support means to an operative position relative to said strapping means, switch means automatically operable to stop movement of said support means in said operative position and to initiate cyclic acutation of said strapping means to wrap a nylon strip peripherally around said rim, tension, cut and secure the ends of said strip together, and piercing means operable in response to completion of said cyclic actuation of said strapping means to cut an aperture in said strip coinciding with said valve stem hole and to initiate movement of said support means to return said wheel to loading position.

2. Apparatus according to claim 1, wherein said wheel support means is adjustable to vary the loading position thereof relative to said strapping means to accommodate wheels of different diameters.

3. Apparatus according to claim 2, wherein said piercing means is operatively mounted on said wheel support means to insure uniform operation thereof regardless of the diameter of the wheel with which it is being employed.

4. Apparatus according to claim 1, wherein said locator means comprises a pin for receiving said valve stem hole.

5. Apparatus according to claim 4, wherein said piercing means comprises a rotatable tubular cutter movable during a piercing operation coaxially relative to said pin.

6. Apparatus according to claim 1, wherein said piercing means is mounted on said wheel support means and comprises a rotary cutter normally disposed in a retracted inoperative position, and cyclically operable means for moving said cutter to operative position in axial alignment with the valve stem hole of a wheel mounted on said support means and retracting said cutter to inoperative position.

7. Apparatus for mounting a nylon strip around the periphery of the rim of a spoked wheel having a valve stem hole therethrough and spokes with their outer ends secured to said rim by nipples extending therethrough, comprising strapping means, wheel support means including locator means cooperating with said valve stem hole to properly position said wheel thereon, means for initiating cyclic actuation of said strapping means to wrap a nylon strip peripherally around said rim, tension, cut and secure the ends of said strip together, and piercing means operable in response to completion of said cyclic actuation of said strapping means to cut an aperture in said strip coinciding with said valve stem hole.

* * * * *